United States Patent [19]

McAlpine

[11] Patent Number: 5,785,456
[45] Date of Patent: Jul. 28, 1998

[54] MATERIAL AND METHOD FOR LINING PIPES

[75] Inventor: George McAlpine, Cary, N.C.

[73] Assignee: Danby of North America, Cary, N.C.

[21] Appl. No.: 712,408

[22] Filed: Sep. 11, 1996

[51] Int. Cl.⁶ ............................................. F16L 1/00
[52] U.S. Cl. ........................ 405/154; 405/146; 405/157
[58] Field of Search ............................. 405/159, 146, 405/157, 150.1, 155.156, 152, 153, 138, 132; 138/97

[56] References Cited

U.S. PATENT DOCUMENTS

| 4,585,371 | 4/1986 | Jones-Hinton . | |
|---|---|---|---|
| 4,678,370 | 7/1987 | Allen . | |
| 5,102,263 | 4/1992 | Allen et al. | 405/151 X |
| 5,145,281 | 9/1992 | Molyneux . | |
| 5,388,929 | 2/1995 | Molyneux . | |
| 5,660,912 | 8/1997 | Menzel | 405/152 X |

Primary Examiner—Tamara L. Graysay
Assistant Examiner—Frederick L. Lagman
Attorney, Agent, or Firm—Hazel & Thomas, P.C.

[57] ABSTRACT

A material and method is provided for lining man-entry sized pipes and securing the lining to the pipe. The lining comprises a unplasticized polyvinyl chloride panel including an interior channel through which grout may be injected. Upon the grout's curing, the grout provides strength and support for a second layer of grout injected into an annulus between the pipe's inner surface and an outer surface of the lining.

33 Claims, 4 Drawing Sheets

MATERIAL AND METHOD FOR LINING PIPES

BACKGROUND OF THE INVENTION

1. Field of the Invention

The present invention relates generally to a method and material for lining underground pipes such as sewer pipes. More particularly, the present invention relates to a method and material particularly suitable for, but not limited to, man-entry sized circular and oviform pipes.

2. Description of the Prior Art

Sewer pipes often become obstructed or structurally deteriorated due to pipe corrosion by hydrogen sulfide, general degradation, organic growth, and root infiltration. As a result, the flow of sewage can become obstructed or the sewer pipe may collapse. A degraded sewer pipe, even if not obstructed, may allow ground water to infiltrate, thus unnecessarily increasing fluid flow to a treatment plant.

The cost associated with replacing sewer pipes can be prohibitively high, and disruption to above ground traffic may not be feasible. Therefore, sewer pipes are often relined rather than replaced. In order to minimize above ground disruption during sewer pipe relining, sewer pipes are often relined using technology that does not require digging a trench above the sewer pipe.

Relining sewer pipes can be accomplished by installing a layer of unplasticized/rigid polyvinylchloride (uPVC) to form a new inner surface in existing pipes. An annular gap may be created between the existing pipe's inner surface and the new liner's outer surface. Grout may then be injected into this annular gap to strengthen and support the new liner as discussed in U.S. Pat. Nos. 5,388,929, 5,145,281 and 4,678,370.

When a relining and grouting process is carried out in man-entry sized pipes, for example pipes having diameters of 36" and larger, the plastic liner must resist the hydraulic head pressure of the grout as it is being pumped into the annulus between the pipe and the plastic liner. Additionally, because gravity forces the grout to the bottom of the annulus, the liner may float on top of grout collected at the bottom of the annulus.

In order to prevent deflection of the liner due to hydraulic head pressure and to prevent floating, grout is usually injected in successive stages or "lifts". Individual grout lifts cannot be injected until the previous lift is sufficiently cured to not transmit the hydraulic pressure to that portion of the PVC liner that it is in contact with. Furthermore, the previous grout lift anchors the PVC liner and resists the hydraulic pressure trying to deflect the liner which could result in the liner pulling out of the partially-cured lower grout layer or pulling the liner and grout together away from the pipe wall by overcoming the bond between the grout and pipe wall. Adequate curing may take as much as 12 to 24 hours. This limits the rate at which grout may be injected during the grouting process and increases the total time for the lining process.

Another method to prevent liner deflection due to excessive hydraulic head pressures is to increase the stiffness of the liner. The ability of the plastic liner to withstand hydraulic head pressure without significant deflection is dependent on the flexural rigidity or stiffness factor of the liner's plastic panels. Flexural rigidity is expressed mathematically as the product of the material's flexural modulus of elasticity (E) and its moment of inertia (I).

A material's flexural rigidity may be influenced by the material's geometric form. For example, a common manner of increasing a material's flexural rigidity is to locate a large amount of the material at a distance from a neutral axis, e.g., as in "T" beams.

Liner material is usually manufactured and shipped to a job sight in flat strips or standard size circular coils. The lining material must then be formed to fit the pipe's shape and must be flexible and light enough to be manually deformed. These limitations determine the maximum value of the material's flexural rigidity. For example, a liner measuring 12" wide with ½" high profile, made from rigid PVC has an EI value of 1600. For this material, it is estimated that grout lifts must be limited to about 6 to 12" of vertical rise to avoid excessive panel deflection. The limited size of these lifts significantly increases the grouting process' total time and cost.

Because of the limitations discussed above, a need exists for a method and material which may be used to line man-entry sized pipes allowing faster and more economical lining and grouting by reducing the number of successively cured lifts.

SUMMARY OF THE INVENTION

It is therefore an object of the present invention to provide a method and material for lining relatively large diameter sewer pipes.

It is a further object to provide a method and material for lining relatively large diameter sewer pipes employing grout installed with or without successively cured lifts.

It is yet another object to provide a method and material for lining relatively large diameter sewer pipes employing an inner layer of grout which provides support for an outer layer of grout.

It is yet another object to provide a method and material for lining relatively large diameter sewer pipes employing an inner layer of grout for reducing the susceptibility of a sewer liner from floating on, and being displaced by, a second layer of grout.

According to one broad aspect of the invention, there is provided an apparatus for lining an interior surface of a pipe, having a panel having a substantially planar body, a smooth inner surface, an outer surface, an anterior terminal end, a posterior terminal end and two opposing edges; a means for stiffening the panel, wherein the stiffening means extends perpendicularly from the outer surface of the body; a wall adjacent and parallel to the outer surface of the body, wherein the wall has an inner and an outer surface; a plurality of channels bounded by the outer surface of the body, a first and second stiffening means, the inner surface of the wall, and having an anterior and posterior opening; a means for plugging the posterior ends of the channels and allowing air to escape from the channels; a means for plugging the anterior end of the channels; a means for locking a plurality of the panels together; and a means for injecting a grout into the channels.

According to another broad aspect of the invention, there is provided a method of lining an interior surface of a pipe, including the steps of spirally winding an elongated strip within the pipe, the strip having respective joint formations along opposing edges, an outer and inner face, a plurality of outwardly directed formations, a horizontal wall, and a plurality of channels defined by the outer face, the outwardly projected formations and the horizontal wall; maintaining an outer circumference of the winding so as to substantially conform to an inner surface of the pipe with the outwardly directed formations facing the inner surface of the pipe; arranging the respective joint formations such that the joint formation on one side of the strip butts against the joint formation along the other side of an adjacent winding of the strip; spirally winding within the pipe an elongated joining strip having a joint formation whereby the joint formation of the joining strip contacts the joint formations of the panels; and forcing the respective adjacent joint formations of the panel and the elongated joining strip into engagement thereby locking the edges of the panels together.

According to yet another broad aspect of the invention, there is provided a method of lining an interior surface of a pipe, including the steps of preparing a number of elongated panels of a predetermined length, the panels having respective joint formations along opposing edges, an outer and inner face, a plurality of outwardly directed formations, a horizontal wall, and a plurality of channels defined by the outer face, the outwardly projected formations an inner face of the horizontal wall, and first and second ends; securing the first and second ends of the panels to the inner surface of the pipe; maintaining an outer circumference of the outwardly directed formations so as to substantially conform to an inner surface of the pipe with the outwardly directed formations facing the inner surface of the pipe; arranging the respective joint formations such that the joint formation on one side of the panel butts against the joint formation along the other side of an adjacent edges of the panel; placing within the pipe an elongated joining strip having a joint formation, whereby the joint formation of the joining strip contacts the joint formations of the panel; and forcing the respective adjacent joint formations of the panel and the elongated joining strip into engagement thereby locking the edges of the panels together.

According to a further broad aspect of the invention, there is provided a lining for an interior surface of a pipe, including a substantially tubular body having a smooth inner surface, an outer surface, an anterior terminal end and a posterior terminal end; a means for stiffening the tubular body away from the interior surface of the pipe, wherein the stiffening means extends perpendicularly from the outer surface of the tubular body; a wall adjacent and parallel to the outer surface of the tubular body, wherein the wall has an inner and an outer surface; and a plurality of channels bounded by the outer surface of the tubular body, a first and second stiffening means, the inner surface of the wall, and having enclosed anterior and posterior openings.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
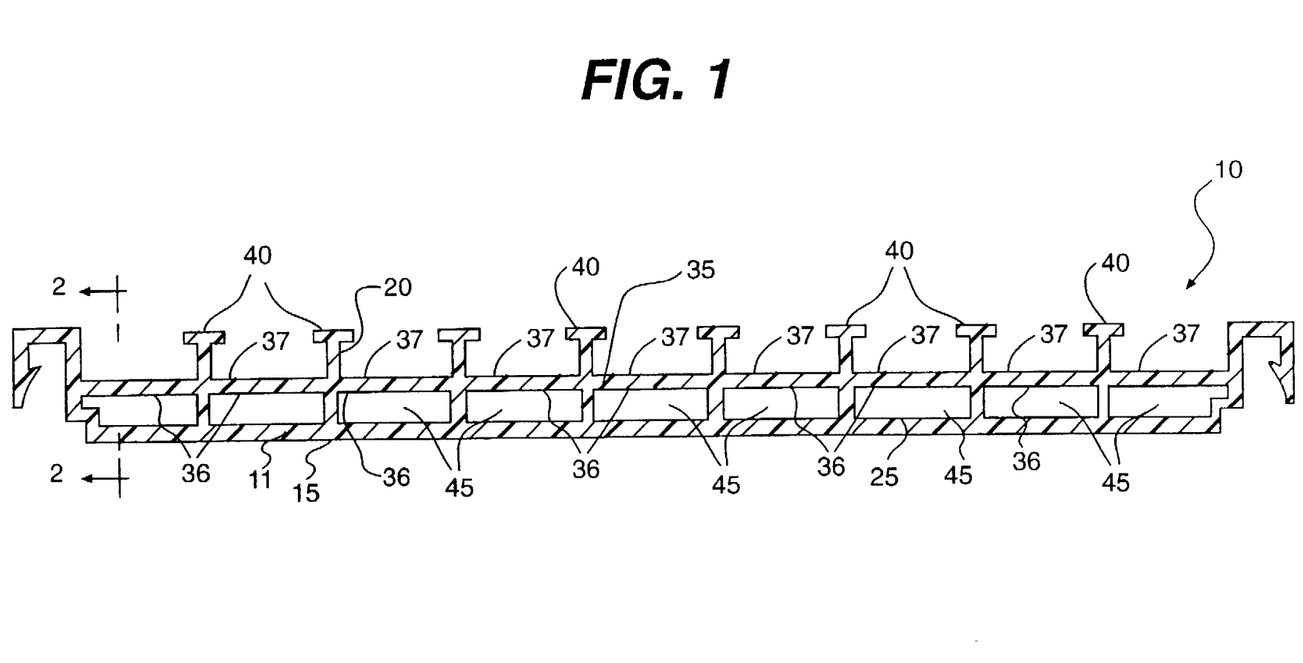
FIG. 1 is a cross sectional view of a liner panel constructed in accordance with a preferred embodiment of the invention.

With reference to the figures, wherein like reference characters indicate like elements throughout the several views and, in particular, with reference to FIG. 1, a panel 10 has an elongated and generally planar body 11, a smooth inner surface 15 and anterior and posterior terminal ends. A plurality of T-shaped legs 20 extend perpendicularly from an outer surface 25 of body 11. Upon installation as described below, T-shaped legs 20 stiffen panel 10 by increasing panel 10's flexural rigidity and may also anchor panel 10 to a grout layer (not shown).

Parallel and adjacent to outer surface 25 is a planar wall 35 having an inner wall surface 36 and an outer wall surface 37. Planar wall 35 is integrally formed with outer surfaces of T-shaped legs 20 and extends the entire width of panel 10. In this fashion, a number of interior channels 45 are bounded by outer surface 25, first and second T-shaped legs 20 and inner wall surface 36. Interior channels 45 extend the length of panel 10.

Figure 2:
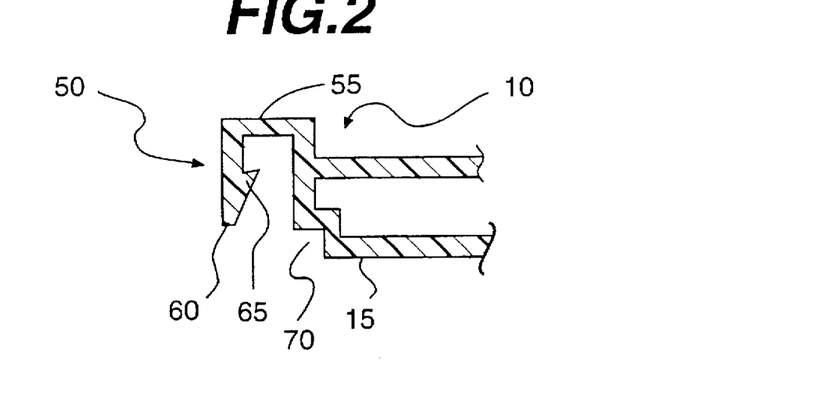
FIG. 2 is a cross sectional view of a locking mechanism taken along lines 2—2' of FIG. 1.

With reference to FIG. 2, opposing edges of panel 10 each include a locking mechanism 50. Locking mechanism 50 includes a retainer 55 having a generally U-shaped cross-section, and a terminal end 60. Terminal end 60 includes a back-swept retaining flange 65 projecting a short distance toward an opposing sidewall of retainer 55. Retainer 55 may be offset from a horizontal plane defined by inner surface 15 of panel 10 creating a notch 70.

Figure 3:
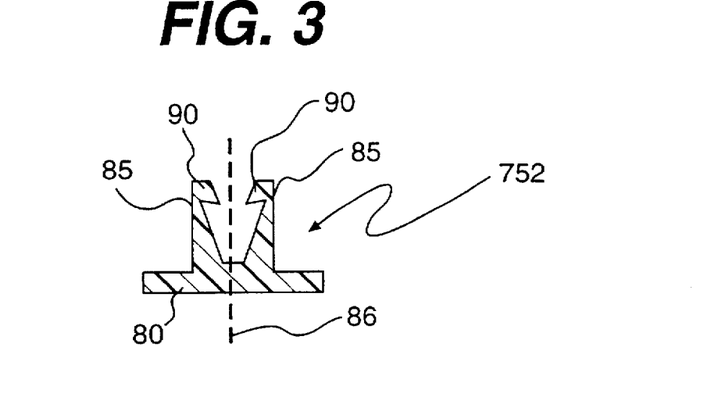
FIG. 3 is a cross sectional view of a clip constructed in accordance with a preferred embodiment of the invention.

Upon installation as discussed below, edges of two adjacent panels 10 may be secured with a joiner strip 75. With reference to FIG. 3, joiner strip 75 is formed into an elongated strip and includes a horizontal member 80 with two vertical members 85 located on opposing sides of a vertical centerline 86 bisecting horizontal member 80. Each vertical member 85 is generally perpendicular to horizontal member 80 and includes a retaining clasp 90 projecting toward vertical centerline 86.

Figure 4:
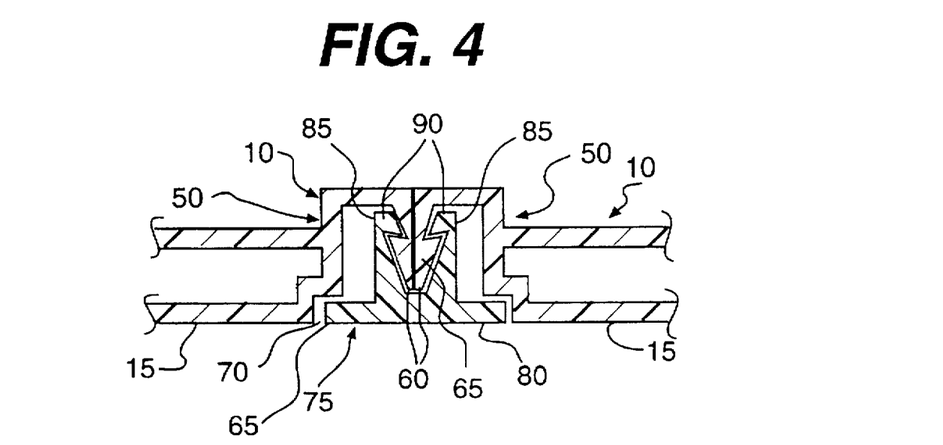
FIG. 4 is a cross sectional view of an assembled locking mechanism constructed in accordance with a preferred embodiment of the invention.

As illustrated in FIG. 4, installation of two panels 10 is performed by positioning two panels 10 adjacent one another and forcing each vertical member 85 of joiner strip 75 over a retaining flange 65 of a locking member 50. In this fashion, retaining clasps 90 and retaining flanges 65 cooperate to lock and secure each panel 10. Additionally, horizontal member 80 of joiner strip 75 fits into notch 70 of inner surface 15 resulting in a smooth and continuous inner surface throughout the length of the pipe liner.

In the preferred construction, panel 10, including body 11, T-shaped legs 20, wall 35, locking mechanism 50 and joiner strip 75 are manufactured from extruded unplasticized polyvinylchloride (uPVC) or high density polyethylene although any suitably flexible and durable material may also be used.

Preferably, grout has a low viscosity prior to curing and should be able to flow freely through relatively small channels. Grout should also be chemically compatible with the material from which panel 10 is formed. When cured, grout should have an elastic modulus much higher than the material from which panel 10 is formed (greater than 400,000 psi). Grout should preferably be formed from widely available and low cost materials such as Portland cement, fly ash or line, water and superplasticizer.

Pipes may be lined with a layer of panels 10 in a number of different configurations. For example, extensive pipe degradation may require lining a pipe's entire inner surface. Alternatively, less severe pipe degradation may require lining only a portion of a pipe's inner surface. These two alternatives are discussed below for illustrative purposes.

To line a pipe's entire inner surface, an elongated length of panel 10 may be passed through a suitable opening in the pipe. Panel 10 may then be curved around the pipe's interior surface in a continuous spiral such that terminal ends 40 of T-shaped legs 20 (FIG. 1) face the pipe's inner surface. Adjacent edges of each panel 10 winding are secured together as described above, resulting in a smooth and continuous lining substantially conforming to the pipe's inner surface. In actual application, an elongated length of panel 10 would normally consist of several 200 foot lengths which are spliced together in the pipe. Such splices must allow the flow of grout to be pumped into the entire lining. Such splices would, therefore, include a plurality of individual couplings shaped as, injectors on both ends. (See FIGS. 9, 110, and FIG. 6, 96.)

Following panel 10's installation, exposed ends of interior channel 45 located at a posterior terminal end of panel 10 are closed with a posterior plug 95. With respect to FIGS. 5 through 7, posterior plug 95 includes projections 96 configured complementary to posterior terminal end of panel 10 and seals the corresponding ends of each interior channel 45. Posterior plug 95 also includes an air escape valve 100 for allowing air to exit from each interior channel 45 when grout is injected as described below.

Figure 5:
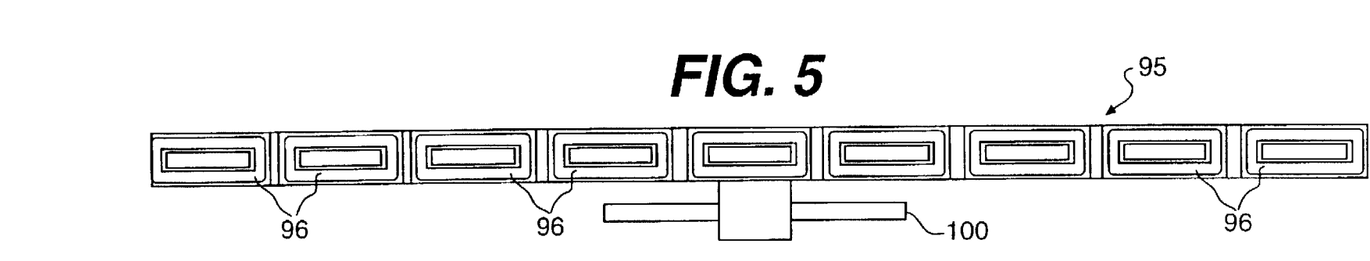
FIG. 5 is a side view of a posterior plug constructed in accordance with a preferred embodiment of the invention.
Figure 6:
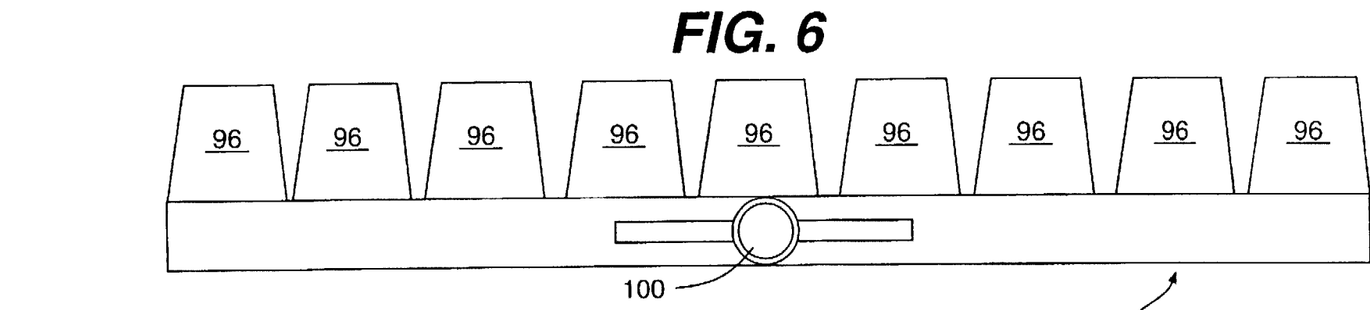
FIG. 6 is a bottom view of a posterior plug constructed in accordance with a preferred embodiment of the invention.
Figure 7:
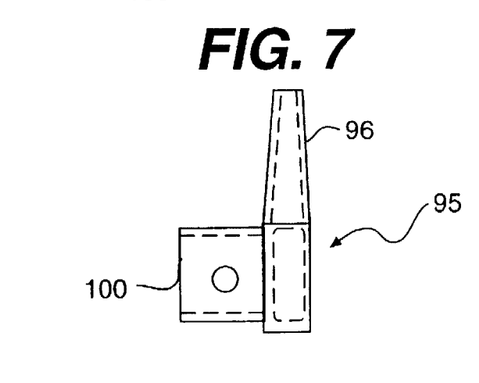
FIG. 7 is an end view of a posterior plug constructed in accordance with a preferred embodiment of the invention.

In a preferred embodiment, air escape valve 100 may be an end-cock allowing air to escape from interior channels 45 and which may be manually closed to prevent grout from escaping when interior channels 45 are full of grout and no air bubbles are observed in the grout flow. Alternatively, air escape valve 100 may be a plug or cap configured complementary to posterior terminal end of panel 10. This version of air escape valve 100 is installed after grout completely fills each interior channel 45.

Figure 8:
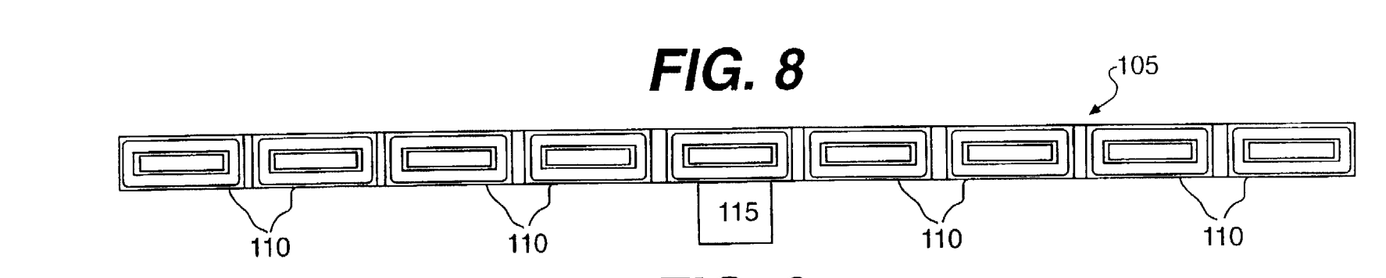
FIG. 8 is a side view of a manifold constructed in accordance with a preferred embodiment of the invention.
Figure 9:
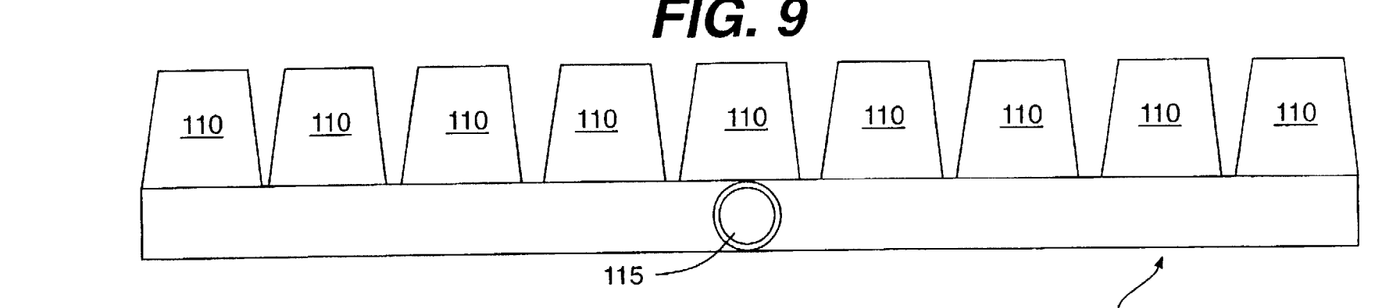
FIG. 9 is a bottom view of a manifold constructed in accordance with a preferred embodiment of the invention.
Figure 10:
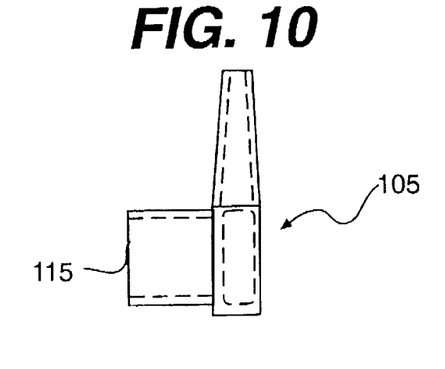
FIG. 10 is an end view of a manifold constructed in accordance with a preferred embodiment of the invention.

Grout is injected into interior channels 45 following the installation of posterior plug 95. Grout is injected into interior channels 45 by means of a manifold 105. As shown in FIGS. 8 through 10, manifold 105 includes injectors 110 configured to fit tightly within an anterior terminal end of panel 10 and which communicate with each interior channel 45. Manifold 105 further includes a receiving tube 115 for coupling with a flexible hose (not shown) through which grout is pumped.

Grout is pumped from an external reservoir, through the flexible hose and through manifold 105 into each interior channel 45 until each interior channel 45 has been completely filled with grout. When each interior channel 45 has been completely filled, manifold 105 is then left in place or is replaced with an anterior plug to prevent grout from leaking out of each interior channel 45. The anterior plug is configured similar to posterior plug 95, except the anterior plug does not have an air escape assembly. The grout is then allowed to cure, i.e. solidify and harden.

In this fashion, the entire pipe is lined with a smooth and continuous uPVC layer having an inner layer of grout. Additionally, an annulus is formed between the pipe's inner surface and wall outer surface 37 of wall 35. An additional layer of grout may then be injected into the annulus between the pipe's inner surface and wall outer surface 37. T-shaped legs 20 become anchored to this second grout layer and panel 10 is thereby securely positioned. The hydraulic head pressure of this second grout layer is supported by the first grout layer and the first grout layer's weight also increases the allowable vertical rise of the second grout layer without "floating" the liner.

In contrast to lining a pipe's entire inner surface as discussed above, it may be desirable to line only portions of the pipe's inner surface. To line a portion of a pipe's inner surface, a number of panel 10 segments are first cut to a predetermined length. Each segment is then curved (circumferential) around the pipe's inner surface such that terminal ends 40 of T-shaped legs 20 face the pipe's inner surface. The ends of these segments are then secured at the lower extremes of the portion of the pipe to be lined by means of fasteners, i.e., mechanical anchors, nails, J-hooks or any other means of supporting the segments. Adjacent edges of each panel 10 segment are secured together as described above, resulting in a smooth and continuous lining inside the pipe.

Following installation of the lining, the posterior terminal end of each panel 10 segment is closed with posterior plug 95 as described above. Grout is then injected into each panel 10 segment and cured as described above. Manifold 105 may also be replaced with the anterior plug. In this fashion, a portion of the pipe's inner surface is lined with a smooth and continuous uPVC layer. Again, a gap is formed between the pipe's inner surface and wall outer surface 37.

An additional layer of grout may then be injected between the pipe's inner surface and wall outer surface 37. T-shaped legs 20 become anchored to this second grout layer and the liner is thereby securely positioned. The hydraulic head pressure of this second grout layer is resisted by the first grout layer.

In this manner, a lining for an inner surface of a pipe is formed having a smooth inner surface, T-shaped legs 20 extending perpendicularly from outer surface 25 and having a number of interior channels 45. Additionally, a cavity is formed between the inner surface of the pipe and outer wall surface 37.

This liner may have interior channels 45 filled with grout and anterior and posterior terminal ends enclosed by the anterior plug and posterior plug 95 respectively. Additionally, the liner may also have the annulus between the inner surface of the pipe and outer wall surface 37 filled with grout. Finally, the liner may have anterior and posterior terminal ends enclosed by a modification of the anterior plug and posterior plug 95.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A structure for lining an interior surface of a pipe, comprising:

an elongated panel having an inner wall, an outer wall, an anterior end, a posterior end and first and second longitudinal edges, said panel being spirally-wound along the interior surface of said pipe such said panel forms a plurality of adjacent spiral portions extending through said pipe; and means for lockingly connecting opposing first and second longitudinal edges of said adjacent spiral portions, wherein said panel includes a plurality of channels defined between said inner wall and said outer wall and extending longitudinally within said panel such that said plurality of channels are spirally-wound as said panel is spirally-wound.

2. A structure for lining an interior surface of a pipe as claimed in claim 1, further comprising:

first grouting material formed between said outer wall of said spirally-wound panel and the interior surface of said pipe.

3. A structure for lining an interior surface of a pipe as claimed in claim 2, further comprising:

second grouting material formed in said plurality of channels defined between said inner and outer walls of said panel.

4. A structure for lining an interior surface of a pipe as claimed in claim 1, wherein said panel further includes means for stiffening said panel, said stiffening means being formed at least on an exterior surface of said outer wall and extending longitudinally along said panel.

5. A structure for lining an interior surface of a pipe as claimed in claim 4, wherein said stiffening means includes a plurality of T-shaped legs extending perpendicular to said inner and outer walls of said panel, said plurality of channels being defined by said inner and outer walls of said panel and said plurality of T-shaped legs extending perpendicular from said inner wall and through said outer wall.

6. A structure for lining an interior surface of a pipe as claimed in claim 1, wherein said panel further includes an anterior end and a posterior end defined on opposite longitudinal portions of said panel, and said plurality of channels are defined to open into said anterior and posterior ends, said structure further comprising:

means for plugging at least one of said anterior and posterior ends of said panel so as to sealably close said plurality of channels at a corresponding end thereof.

7. A structure for lining an interior surface of a pipe as claimed in claim 6, wherein said plugging means includes a plugging panel having a length corresponding to a width of at least one of said anterior and posterior ends of said spirally-wound panel, and a plurality of plug projections extending perpendicular to said length of said plugging panel, each of said plug projections being formed to plug into a corresponding one of said plurality of channels defined in said spirally-wound panel.

8. A structure for lining an interior surface of a pipe as claimed in claim 6, wherein said plugging means includes a plugging panel having a length corresponding to a width of at least one of said anterior and posterior ends of said spirally-wound panel, a plurality of plug projections extending perpendicular to said length of said plugging panel, each of said plug projections being formed to plug into a corresponding one of said plurality of channels defined in said spirally-wound panel, and an escape valve connected to said plugging panel through which air may escape through said plug projections and said plugging panel from said plurality of channels when grouting material is formed therein.

9. A structure for lining an interior surface of a pipe as claimed in claim 6, further comprising:

means for injecting grouting material into said plurality of channels, said grouting injecting means including a manifold having a length corresponding to a width of at least one of said anterior and posterior ends of said spirally-wound panel, a plurality of manifold injectors extending perpendicular to said length of said manifold, each of said manifold injectors being formed to plug into a corresponding one of said plurality of channels defined in said spirally-wound panel, and a grout receiving tube connected to said manifold through which grouting material is introduced through said manifold and said manifold injectors and into said plurality of channels.

10. A structure for lining an interior surface of a pipe as claimed in claim 1, wherein said panel is formed from at least one of unplasticized polyvinylchloride and high density polyethylene.

11. A structure for lining an interior surface of a pipe as claimed in claim 1, wherein said means for lockingly connecting opposing first and second longitudinal edges of said adjacent spiral portions includes an elongated joiner strip having upstanding joiner members formed on an outer surface thereof and extending longitudinally along an entire length of said joiner strip, said first and second longitudinal edges of said panel each being formed with a retainer portion extending longitudinally along an entire length of said first and second longitudinal edges, said retainer portions having a generally U-shaped cross-section, and said joiner strip being positioned between said adjacent spiral portions of said panel such that said joiner members of said joiner strip longitudinally interengage retainer portions of said opposing first and second longitudinal edges of said adjacent spiral portions of said panel.

12. A system for lining an interior surface of a pipe, comprising:

a plurality of elongated panels, each panel having an inner wall, an outer wall, an anterior end, a posterior end and first and second longitudinal edges, said plurality of panels being positioned end-to-end with each other and spirally-wound along the interior surface of said pipe such said plurality of panels form a plurality of adjacent spiral portions extending through said pipe; and means for lockingly connecting opposing first and second longitudinal edges of said adjacent spiral portions, wherein each individual one of said panels includes a plurality of channels defined between said inner wall and said outer wall, said plurality of channels extending longitudinally within a respective panel such that said plurality of channels are spirally-wound as said respective panel is spirally-wound.

13. A system for lining an interior surface of a pipe as claimed in claim 12, further comprising:

first grouting material formed between said outer wall of said spirally-wound panels and the interior surface of said pipe.

14. A system for lining an interior surface of a pipe as claimed in claim 13, further comprising:

second grouting material formed in said plurality of channels defined between said inner and outer walls of each of said plurality of panels.

15. A system for lining an interior surface of a pipe as claimed in claim 12, wherein each individual one of said plurality of panels includes means for stiffening said individual panel, said stiffening means being formed at least on an exterior surface of said outer wall and extending longitudinally along said individual panel.

16. A system for lining an interior surface of a pipe as claimed in claim 12, wherein said stiffening means includes a plurality of T-shaped legs extending perpendicular to said inner and outer walls of each of said plurality of panels, said plurality of channels being defined by said inner and outer walls of each of said panels and said plurality of T-shaped legs extending perpendicular from said inner wall and through said outer wall.

17. A system for lining an interior surface of a pipe as claimed in claim 12, wherein said plurality of panels are formed from at least one of unplasticized polyvinylchloride and high density polyethylene.

18. A system for lining an interior surface of a pipe as claimed in claim 12, wherein said means for lockingly connecting opposing first and second longitudinal edges of said adjacent spiral portions includes an elongated joiner strip having upstanding joiner members formed on an outer surface thereof and extending longitudinally along an entire length of said joiner strip, said first and second longitudinal edges of each of said panels each being formed with a retainer portion extending longitudinally along an entire length of said first and second longitudinal edges, said retainer portions having a generally U-shaped cross-section, and said joiner strip being positioned between said adjacent spiral portions of said spirally-wound plurality of panels such that said joiner members of said joiner strip longitudinally inter-engage retainer portions of said opposing first and second longitudinal edges of said adjacent spiral portions.

19. A method of lining an interior surface of a pipe, comprising the steps of:

providing an elongated panel having an inner wall, an outer wall, an anterior end, a posterior end, first and second longitudinal edges and a plurality of channels defined between said inner wall and said outer wall and extending longitudinally within said elongated panel;

spirally winding said elongated panel along the interior surface of said pipe such that said panel forms a plurality of adjacent spiral portions extending through said pipe and said plurality of channels are spirally-wound as said panel is spirally-wound; and lockingly connecting opposing first and second longitudinal edges of said adjacent spiral portions.

20. A method of lining an interior surface of a pipe as claimed in claim 19, further comprising the step of:

injecting a first grouting material between said outer wall of said spirally-wound panel and the interior surface of said pipe.

21. A method of lining an interior surface of a pipe as claimed in claim 20, further comprising the step of:

injecting a second grouting material into said plurality of channels defined between said inner and outer walls of said panel.

22. A method of lining an interior surface of a pipe as claimed in claim 21, wherein said panel further includes an anterior end and a posterior end defined on opposite longitudinal portions of said panel, and said plurality of channels are defined to open into said anterior and posterior ends, and said step of injecting a second grouting material into said plurality of channels defined between said inner and outer walls of said panel further includes plugging at least one of said anterior and posterior ends of said panel so as to sealably close said plurality of channels at a corresponding end thereof.

23. A method of lining an interior surface of a pipe as claimed in claim 22, wherein said step of plugging said panel includes providing an escape valve through which air may escape from said plurality of channels when grouting material is injected therein.

24. A method of lining an interior surface of a pipe as claimed in claim 21, wherein said step of injecting said second grouting material into said plurality of channels includes providing a manifold that has a length corresponding to a width of at least one of anterior and posterior ends of said spirally-wound panel, a plurality of manifold injectors extending perpendicular to said length of said manifold, each of said manifold injectors being formed to plug into a corresponding one of said plurality of channels defined in said spirally-wound panel, and a grout receiving tube connected to said manifold through which said second grouting material is introduced through said manifold and said manifold injectors and into said plurality of channels, plugging said manifold with an anterior end of said spirally-wound panel, and injecting said second grouting material into said grout receiving tube.

25. A method of lining an interior surface of a pipe as claimed in claim 19, wherein said panel further includes an anterior end and a posterior end defined on opposite longitudinal portions of said panel, and said plurality of channels are defined to open into said anterior and posterior ends, said method further comprising the step of:

plugging at least one of said anterior and posterior ends of said panel so as to sealably close said plurality of channels at a corresponding end thereof.

26. A method of lining an interior surface of a pipe as claimed in claim 25, wherein said step of plugging said panel includes providing a plugging panel that includes a length corresponding to a width of at least one of anterior and posterior ends of said spirally-wound panel, a plurality of plug projections extending perpendicular to said length of said plugging panel, each of said plug projections being formed to plug into a corresponding one of said plurality of channels defined in said spirally-wound panel, and an escape valve connected to said plugging panel through which air may escape through said plug projections and said plugging panel from said plurality of channels when grouting material is injected therein.

27. A method of lining an interior surface of a pipe as claimed in claim 19, wherein said step of providing said panel includes forming said panel from at least one of unplasticized polyvinylchloride and high density polyethylene.

28. A method of lining an interior surface of a pipe as claimed in claim 19, wherein said step of providing said panel includes forming each of first and second longitudinal edges of said panel with a retainer portion extending longitudinally along an entire length of said first and second longitudinal edges, said retainer portions having a generally U-shaped cross-section, and said step of lockingly connecting opposing first and second longitudinal edges of said adjacent spiral portions includes providing an elongated joiner strip having upstanding joiner members formed on an outer surface thereof and extending longitudinally along an entire length of said joiner strip, and positioning said joiner strip between said adjacent spiral portions of said panel such that said joiner members of said joiner strip longitudinally inter-engage retainer portions of said opposing first and second longitudinal edges of said adjacent spiral portions of said panel.

29. A method for lining an interior surface of a pipe, comprising the steps of:

provviding a plurality of elongated panels, each panel having an inner wall, an outer wall, an anterior end, a posterior end, first and second longitudinal edges, and a plurality of channels defined between said inner wall and said outer wall and extending longitudinally within said elongated panel;

positioning said plurality of panels end-to-end with each other;

spirally winding said end-to-end plurality of panels along the interior surface of said pipe such that said plurality of panels form a plurality of adjacent spiral portions extending through said pipe and said plurality of channels are spirally-wound as said plurality of panels are spirally-wound; and lockingly connecting opposing first and second longitudinal edges of said adjacent spiral portions.

30. A method for lining an interior surface of a pipe as claimed in claim 29, further comprising the step of:

injecting a first grouting material between said outer wall of said spirally-wound panels and the interior surface of said pipe.

31. A method for lining an interior surface of a pipe as claimed in claim 30, further comprising the step of:

injecting a second grouting material into said plurality of channels defined between said inner and outer walls of each of said plurality of panels.

32. A method for lining an interior surface of a pipe as claimed in claim 29, wherein said step of providing said plurality of panels includes forming said panels from at least one of unplasticized polyvinylchloride and high density polyethylene.

33. A method for lining an interior surface of a pipe as claimed in claim 29, wherein said step of providing said plurality of panels includes forming each of first and second longitudinal edges of each of said panels with a retainer portion extending longitudinally along an entire length of said first and second longitudinal edges, said retainer portions having a generally U-shaped cross-section, and said step of lockingly connecting opposing first and second longitudinal edges of said adjacent spiral portions includes providing an elongated joiner strip having upstanding joiner members formed on an outer surface thereof and extending longitudinally along an entire length of said joiner strip, and positioning said joiner strip between said adjacent spiral portions of said plurality of spirally-wound panels such that said joiner members of said joiner strip longitudinally interengage retainer portions of said opposing first and second longitudinal edges of said adjacent spiral portions of said panels.

* * * * *